United States Patent [19]

Chaffee et al.

[11] Patent Number: 5,081,172
[45] Date of Patent: Jan. 14, 1992

[54] METHOD TO REDUCE COMPRESSION SET IN SILANOL-CONTAINING SILICONE ELASTOMER BASES

[75] Inventors: Roger G. Chaffee; Lawrence D. Fiedler; Myron T. Maxson, all of Midland, Mich.

[73] Assignee: Dow Corning Corporation, Midland, Mich.

[21] Appl. No.: 450,704

[22] Filed: Dec. 13, 1989

[51] Int. Cl.$^5$ ................................................ C08K 5/54
[52] U.S. Cl. ............................... 524/188; 524/717; 524/730; 524/731
[58] Field of Search ................ 524/188, 717, 730, 731

[56] References Cited

U.S. PATENT DOCUMENTS

| | | | |
|---|---|---|---|
| 3,002,951 | 10/1961 | Johannson | 260/46.5 |
| 3,006,878 | 10/1961 | Talcott | 260/29.1 |
| 3,179,619 | 4/1965 | Brown | 260/37 |
| 3,274,153 | 9/1966 | Hyde et al. | 260/46.5 |
| 3,294,740 | 12/1966 | McVannel | 260/46.5 |
| 3,373,138 | 3/1968 | Brown | 260/46.5 |
| 3,997,496 | 12/1976 | Razzano | 260/46.5 R |
| 4,116,919 | 9/1978 | Elias et al. | 260/375 B |
| 4,267,298 | 5/1981 | Bluestein | 528/34 |
| 4,341,888 | 7/1982 | Razzano | 528/14 |
| 4,683,277 | 7/1987 | Maxson | 528/21 |
| 4,882,368 | 11/1989 | Elias et al. | 523/213 |

FOREIGN PATENT DOCUMENTS

| | | |
|---|---|---|
| 174260 | 7/1987 | Japan . |
| 2118960 | 9/1923 | United Kingdom . |
| 897305 | 5/1962 | United Kingdom . |

Primary Examiner—Melvyn I. Marquis
Attorney, Agent, or Firm—Roger H. Borrousch

[57] ABSTRACT

A method of reducing the compression set of a silicone elastomer is accomplished by mixing an alkenyl silazane with a previously prepared, based heated, silanol-containing silicone elastomer base. Fluorosilicone elastomers prepared by these methods find use in gasketing and sealing application which are exposed to fuels and solvents.

30 Claims, No Drawings

METHOD TO REDUCE COMPRESSION SET IN SILANOL-CONTAINING SILICONE ELASTOMER BASES

BACKGROUND OF THE INVENTION

1. Field of the Invention

This invention relates to a method of reducing the compression set of silanol-containing silicone elastomer bases and of special interest are fluorosilicone elastomer bases.

2. Background Information

Compression set in rubber is the residual deformation of the rubber after removal of the compressive stress. Compression set is measured thirty minutes after removal from the loading device in which the specimen had been subjected for a definite time to compression deformation under specified conditions of load application and environment. Compression set is an important property for many applications of rubber, such as being used as a gasket to seal a fuel line, a fuel tank, and other equipment which might be used for distribution and holding of fuels. Fuels and solvents are very harsh environment for rubber products and certain types of rubbers have been developed for use as gasketing material, hose material, and bladder materials which come into contact with fuels and solvents. One such rubber is fluorosilicone rubber which has excellent resistance to deterioration by contact with fuels and solvents. However, fluorosilicone rubber has suffered from a high compression set which is a negative characteristic for use in many applications, such as in gasketing applications. As so often happens with materials where one wishes to improve one property, improving that property results in the decrease in one or more other properties, so that the final material chosen usually ends up in a compromised property profile.

Fluorosilicone rubber has been known for many years and has been used in the applications of fuel gaskets in spite of the high compression set. Fluorine-containing polydiorganosiloxane gums are known from Johannson in U.S. Pat. No. 3,002,951, issued Oct. 3, 1961. Johannson teaches a method of preparing high molecular weight gums having perfluoroalkyl radicals on silicon from cyclic siloxane trimers. The gums prepared by Johannson's method are hydroxyl endblocked and are proposed as suitable for the preparation of rubber, a fluorosilicone rubber. Johannson is hereby incorporated by reference to show gum of perfluoroalkyl containing siloxanes and their preparation. Other gum polymers containing the perfluoroalkyl radical are shown by Hyde et al in U.S. Pat. No. 3,274,153, issued Sept. 20, 1966; McVannel in U.S. Pat. No. 3,294,740, issued Dec. 27, 1966; and Brown in U.S. Pat. No. 3,373,138, issued Mar. 12, 1968 which are all hereby incorporated by reference to show hydroxyl endblocked polymethyl(3,3,3-trifluoropropyl)siloxane gums and their preparation. Razzano in U.S. Pat. No. 3,997,496, issued Dec. 14, 1976, teaches a method of making silanol end-stopped perfluoroalkyl-substituted organopolysiloxane homopolymer or copolymers by using a non-bond-rearranging catalyst starting with low molecular weight silanol polymers. Razzano also teaches that the molecular weight of the silanol end-stopped perfluoroalkyl-substituted organopolysiloxanes can be regulated by using a very low molecular weight trimethylsiloxy and silanol end-stopped polydimethylsiloxane, where the more regulator used, the lower the molecular weight of the resulting polymer. The highest molecular weight polymers are obtained without the use of regulator. Similar chain-stoppers are described by Razzano in U.S. Pat. No. 4,341,888, issued July 27, 1982, in his method of making polydiorganosiloxanes.

Bluestein in U.S. Pat. No. 4,267,298, issued May 12, 1981, teaches that the preparation of triorganosilyl endstopped fluoro substituted polysiloxane fluids are very difficult to make. If one attempts to use a triorganosilyl chain stopper or regulator while making the polymers, one either proceeds directly to a high gum polymer without the chain stopper being polymerized into the polymer or the polymer does not form but only cyclotetrasiloxanes form. Bluestein teaches that a silanol endblocked polydiorganosiloxane is reacted with a triorganochlorosilane to give the endblocked polysiloxane fluids.

Bluestein et al in U.K. Patent Application No. 2,118,960, published Nov. 9, 1983, teach that silanol or aliphatic alcohol chain-stopped fluorosilicone polymers can be compounded into elastomer compositions which cure to elastomers with compression set values such as 36% (347° F./22 hours) and by the use of rare earth octoates as compression set additives can be 39.0% for silanol chain-stopped (350° F./22 hours) and 34.1% for trimethylsiloxy chain-stopped (350° F./22 hours).

Brown in U.S. Pat. No. 3,179,619, issued Apr. 20, 1965, teaches low swell organosiloxane rubbers containing fluorinated aliphatic radicals attached to the silicon atom of the polysiloxane gum chain. Brown teaches that the use of limited amounts of vinyl containing siloxane units in the gums gives elastomers of superior compression set. Brown reports tension set values in his Example 1, but does not report any compression set values. Brown also teaches that fluorosilicone rubber with tensile strengths of 1,200 psi with elongations of 540 percent can be made using a polysiloxane gum of methyl(3,3,3-trifluoropropyl)siloxane units, fume silica, and benzoyl peroxide.

Talcott in U.S. Pat. No. 3,006,878, issued Oct. 31, 1961, teaches the preparation of fluorinated silicone rubber compositions based on gums such as described by Johannson. These fluorinated silicone rubber compositions described by Talcott are prepared by base heating a mixture of 3,3,3-trifluoropropylmethylpolysiloxane gum, silica filler such as fume silica, and 3,3,3-trifluoropropylmethylsiloxane fluid which is hydroxyl endblocked. Talcott teaches that the use of limited amounts of vinyl containing siloxane units in the gum gives elastomers of superior compression set, as was taught by Brown in U.S. Pat. No. 3,179,619, filed June 27, 1956. No values for compression set are reported for the compositions described in Talcott.

Pierce in U.S. Pat. No. 3,122,521, issued Feb. 25, 1964, teaches a method of polymerizing fluoroalkyl-substituted cyclotrisiloxanes to make high molecular weight polymers. Pierce teaches that using these polymers to make compositions which cure to silicone rubber with improvement in the tear strength and an occasional improvement in the tensile strength. One fluorosilicone rubber, after curing for 24 hours at 150° C. has a tensile strength at break of 1,770 psi and an elongation at break of 340 percent. The gum used to make this fluorosilicone rubber was made from 99.6 mol percent 3,3,3-trifluoropropylmethylsiloxane units and 0.4 mol percent methylvinylsiloxane units with a Williams plasticity of about 0.250 inch. Pierce reports tear strengths of 117 pounds per inch, but no compression set values are reported.

Elias et al in U.S. Pat. No. 4,116,919, issued Sept. 26, 1978, teach a treated reinforcing silica which can be used to make silicone elastomers with improved durometer and tear strength. The silica is treated with a mixture of a hexaorganodisilazane and bis-Si-(1-methyl-1-silacyclopentenyl)amine. The silica can be treated either in situ during the manufacture of curable silicone elastomer compositions or as a separate operation. Elias et al ('919) teach that the mixture of silazanes, silica, and triorganosiloxy endblocked polydiorganosiloxane fluid can be mixed to "in situ treat" the silica. The compositions of Elias et al ('919) are those which contain a vinyl containing polysiloxane, the treated silica filler, organohydrogenpolysiloxane crosslinker, and a platinum catalyst. However, Elias et al ('919) do not teach peroxide cured perfluoroalkyl containing polydiorganosiloxanes with improved compression set.

Nitzsche et al in United Kingdom Patent No. 897,305, published May 23, 1962 teach that diorganopolysiloxane elastomers with low compression set can be prepared from diorganopolysiloxane containing a small percentage of vinyl groups (0.05 to 1.0 mol percent), a filler which has been pretreated with an alkenyl silane or a filler which consists of a hydrolyzed and condensed vinyl or allyl trichlorosilane. These elastomers are crosslinked using peroxides or by exposure to high energy radiation.

Maxson in U.S. Pat. No. 4,683,277, issued July 28, 1987, teaches the preparation of liquid diorganovinylsiloxy terminated polydiorganosiloxane of the formula

in which R* is a monovalent hydrocarbon radical R** is a perfluoroalkylethyl radical, R" is R* or R**, Vi is vinyl and p is 10 to 200. This liquid polymer is prepared by reacting a silanol terminated polydiorganosiloxane liquid with a disilazane to give the terminated liquid polymer.

Shin Etsu Chem Ind KK in Japanese OPI 62/174,260, published July 31, 1987, teaches fluorosilicone rubber which is made from organopolysiloxane which contains vinyl groups on a terminal and reports that the tensile strength and elongation are improved.

Reduction in compression set values of silicone rubber, including fluorosilicone rubber, has been achieved by many routes, such as by the use of metal oxides and carboxylates, and by the introduction of vinyl radical in the polymer chain. Because some of these techniques for compression set reduction are suitable for some types of silicone rubber, they do not provide satisfactory reductions for other types of silicone rubber. While it is known that the compression set values can be reduced by the use of polysiloxanes which contain small amounts of vinyl radical, still further reductions are desirable for fluorosilicone rubber.

Elias et al in U.S. Pat. No. 4,882,368, issued Nov. 21, 1989, teach that the compression set of fluorosilicone rubber can be lowered by endblocking the fluorine-containing polydiorganosiloxane gums used to make the fluorosilicone rubber with alkenyl unsaturation. A method of making the alkenyl endblocked fluorine-containing polydiorganosiloxane gum is to react the hydroxyl endgroups with alkenyl containing silazane compounds. The gum is then mixed with a hydrophobed reinforcing silica filler and an organic peroxide to make a composition which can be cured to a fluorosilicone rubber with a lower compression set than the same composition where the polydiorganosiloxane does not contain the alkenyl endblocking. Elias et al ('368) requires that the polydiorganosiloxanes are first prepared prior to the preparation of the compositions which are cured to make the fluorosilicone rubber. Although this is an acceptable route to low compression set fluorosilicone rubbers, a more flexible method of lowering the compression set is desirable. Lowering the compression set of an otherwise suitable silicone elastomer provides increased flexibility by making a single base applicable for more uses, such as situations where the compression set is not of importance and for applications where the compression set is very important as it is in gasketing.

SUMMARY OF THE INVENTION

An object of this invention is to provide a method for lowering the compression set of a silicone elastomer obtained from an existing silanol-containing silicone elastomer base. Another object is to provide a method of making fluorosilicone elastomers which have reduced compression set values while at the same time maintaining at least some of the other physical properties and solvent resistant properties at respectable values or even increasing them. It was entirely unexpected that mixing a small amount of an alkenyl containing silazane with existing silanol-containing silicone elastomer bases would reduce the compression set values.

This invention relates to a method to reduce compression set in silicone elastomer comprising adding a compression set reducing amount of an alkenyl silazane to a previously prepared, base heated, silanolcontaining silicone elastomer base comprising a polydiorganosiloxane gum and a reinforcing silica filler, where the silazane has the formula $(X)_2NH$ in which X is a silyl selected from the group consisting of methylphenylvinylsilyl,

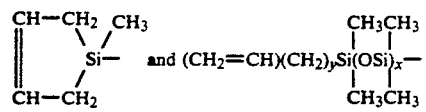

in which x has a value of from 0 to 10 and y has a value of 0 to 8, mixing the silazane and the silicone elastomer base in a closed mixer with heating means and means for drawing a vacuum, heating the mixer contents at a temperature and for a time sufficient to allow silazane to react with silanol groups in the silicone elastomer base, removing by-produced ammonia, by-produced siloxane dimer, and any unreacted alkenyl silazane from the mixer contents, obtaining a modified silicone elastomer base which cures to a silicone elastomer having a compression set lower than a silicone elastomer obtained by curing the silicone elastomer base which is unmodified with alkenyl silazane, adding an amount of an organic peroxide sufficient to cure the modified silicone elastomer base when heated.

DESCRIPTION OF THE EMBODIMENTS

The silanol-containing silicone elastomer bases are known in the art and comprise a base-heated mixture of a polydiorganosiloxane and a reinforcing silica filler. The polydiorganosiloxane and the silica filler are base heated to stabilize the resulting base. A phenomenon known as "crepe hardening" takes place when the polydiorganosiloxane and the silica filler are mixed. During storage the mixture becomes difficult to handle because the polymer and the silica interact and a softening process, such as milling the base, is required. To reduce this effect, the bases are mixed and heated, especially in the presence of a plasticizer, such as hydroxyl endblocked polydiorganosiloxane fluid, for example hydroxyl endblocked polydimethylsiloxane fluid, hydroxly endblocked polymethylphenylsiloxane fluid, and hydroxyl endblocked poly(methyl-3,3,3-trifluoropropyl)siloxane fluid, diphenylsilanediol, various silazanes, and other hydroxyl and alkoxy organosiloxane compounds. Also organochlorosilanes and hexaorganodisiloxanes can be used to treat the silica filler during the base heating step. The plasticizers pacify the silica and reduce the effects of the polymer-filler interaction. All these kinds of base heating processes are well known in the art and do not in themselves form a part of the present invention, except that they are part of the existing or previously prepared silicone elastomer bases which are known in the art.

The silicone elastomer bases comprise a hydroxyl endblocked polydiorganosiloxane gum and a reinforcing silica filler. In these bases the hydroxyl endblocked polydiorganosiloxane gum can be any of the polydiorganosiloxanes which are known in the art for the preparation of silicone elastomer bases such as hydroxyl endblocked poly(co-dimethylsiloxane-methylphenylsiloxane-methylvinylsiloxane), hydroxyl endblocked polydimethylsiloxane, hydroxyl endblocked poly(co-dimethylsiloxane-methylvinylsiloxane), hydroxyl endblocked poly(methyl-3,3,3-trifluoropropylsiloxane), hydroxyl endblocked poly(co-methylvinylsiloxane-methyl-3,3,3-trifluoropropylsiloxane), and mixtures of these hydroxyl endblocked polydiorganosiloxanes with one or more of triorganosilyl endblocked polydiorganosiloxanes such as dimethylvinylsiloxy endblocked poly(methyl-3,3,3-trifluoropropylsiloxane), dimethylvinylsiloxy endblocked polydimethylsiloxane, methylphenylvinylsiloxy endblocked polydimethylsiloxane, dimethylvinylsiloxy endblocked poly(co-dimethylsiloxane-methylvinylsiloxane), and various mixtures thereof.

For fuel and solvent resistant silicone elastomers, the silicone elastomer bases are preferably those in which the polydiorganosiloxane gum of the silicone elastomer base is at least 90 weight percent of a polydiorganosiloxane of a general formula

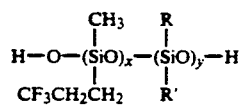

in which x has a value of at least 800, y has a value of from 0 to 20 percent of the sum of x plus y, the sum of x and y is at least 1000, each R is methyl or phenyl, each R' is vinyl or phenyl, where there is a maximum of 2 mol percent methylvinylsiloxane units in said polydiorganosiloxane, and up to 10 weight percent of polydiorganosiloxane in which the diorganosiloxane units are composed of 0.1 to 10 mole percent methylvinylsiloxane units and 90 to 99.9 mole percent dimethylsiloxane units.

In the method of the present invention, these silanol-containing silicone elastomer bases are mixed with alkenyl silazane, the mixture is heated and then vacuum is drawn on the mixture. The mixing step is carried out in a closed container because the alkenyl silazane has a volatility which can result in loss of material before it has a chance to react if open reactors are used. Also, closed mixers are necessary to provide the ability to draw off the by-produced ammonia, by-produced siloxane dimer, and any remaining unreacted alkenyl silazane by reducing the mixer pressure, such as with a "vacuum". An amount of alkenyl silazane added to the silicone elastomer base is that amount which causes the compression set of the cured modified silicone elastomer base to be lowered compared to the unmodified silicone elastomer base. Preferably, the amount of alkenyl silazane added is from 0.1 to 2 weight percent based on the weight of the silicone elastomer base.

The alkenyl silazane can be tetramethyldivinyldisilazane, tetramethyldiallyldisilazane, tetramethyldihexenyldisilazane, alkenyl silazanes of the formulae

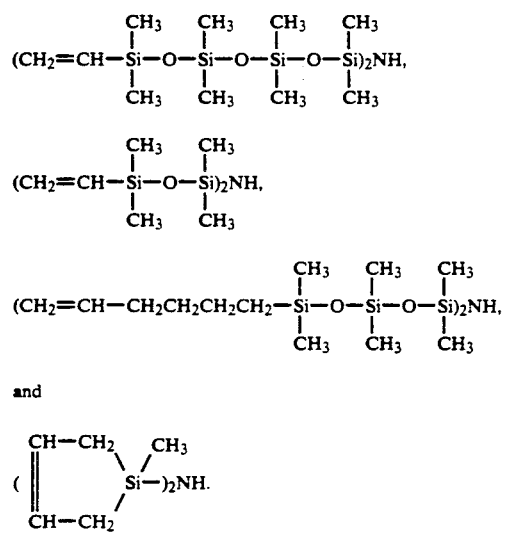

and

A preferred alkenyl silazane is tetramethyldivinyldisilazane.

The alkenyl silazane is added to the silicone elastomer base in a closed mixer which is equipped with a stirring mechanism, a heating means, and a means for drawing a vacuum. Such mixers are known in the art, for example the bread dough mixer type with a sigma blade, a Baker-Perkins mixer. The closed mixer is heated to a temperature and time sufficient to promote reaction of the alkenyl silazane with the silanol-containing silicone elastomer base, such temperatures can be from about 80° C. to 200° C. for from 30 minutes to 5 or more hours. Preferred temperature are from 100° C. to 170° C. for from 1 to 4 hours. While the mixture is still hot after the heating process, a vacuum is drawn on it and the volatile materials are drawn off, which include the by-produced ammonia from the silazane, the by-produced siloxane dimers, and any unreacted alkenyl silazane. The by-produced siloxane dimers are the volatile siloxane products resulting from the alkenyl silazanes, and can be illustrated by tetramethyldivinyldisiloxane, tetramethyldiallyldisiloxane, tetramethylhexenyldisiloxane, and siloxane dimers of the formulae

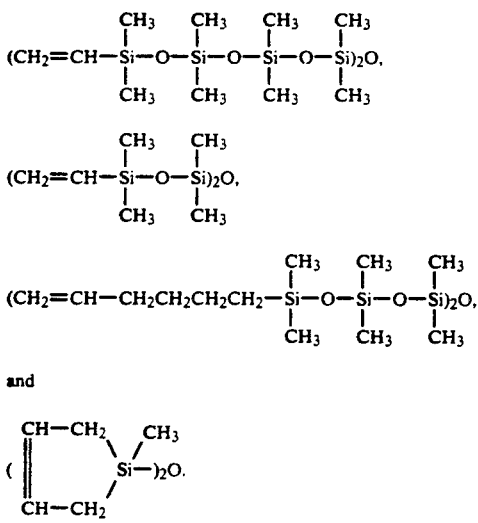

and

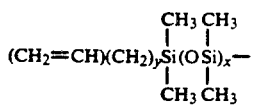

The removal of the ammonia and the unreacted alkenyl silazane are necessary because these material can interfere with the cured properties. The silicone elastomer base may crepe harden if ammonia remains in it during storage. The vacuum is applied for a time sufficient to remove the ammonia and the unreacted alkenyl silazane which may be 15 minutes to three hours.

It is believed that the alkenyl silazane reacts with the silanol groups in the silicone elastomer base. The silanols can be those of the polydiorganosiloxane gum, from the reinforcing silica filler, or from other siloxane species which may be present in the silicone elastomer base, such as hydroxyl endblocked polydiorganosiloxane fluids. Exactly what reactions occur is not known but the result of reduced compression set, tear strengths, and elongation along with higher modulus and durometer suggests that the alkenyl silazane reacts with the silanols and then the alkenyl groups become available to increase the crosslink density.

The polydiorganosiloxane of the silicone elastomer base can be those of Elias et al ('368) which are silanol-containing. Elias et al ('368) is hereby incorporated by reference. The silicone elastomer bases contain at least 80 mol percent methyl(3,3,3-trifluoropropyl)siloxane units with the remaining units, up to 20 mol percent, of dimethylsiloxane units, methylvinylsiloxane units, methylphenylsiloxane units, and diphenylsiloxane units. These polydiorganosiloxanes can contain units other than diorganosiloxane units, such as monoorganosilsesquioxane units and SiO2 units but in small amounts, such as less than one mol percent. The polydiorganosiloxane can be one type of polymer or a mixture of two or more types of polymers. These polydiorganosiloxanes have endgroups where X is a hydrogen atom (also termed a silanol group) or X is a silyl unit selected from methylphenylvinylsilyl, Si-methyl-(silacyclopentenyl), or a silyl of the formula $$(CH_2=CH)(CH_2)_y\overset{\underset{\mid}{CH_3}}{\underset{\underset{\mid}{CH_3}}{Si}}(OSi)_x\overset{\underset{\mid}{CH_3}}{\underset{\underset{\mid}{CH_3}}{-}}$$

The polydiorganosiloxanes useful in the present invention have some silanol endgroups and therefore those polydiorganosiloxanes having silyl endgroups are present in amounts of less than 100 weight percent of the polydiorganosiloxane, such as less than 50 weight percent. The polydiorganosiloxanes having triorganosilyl endgroups can be obtained by reacting a hydroxyl endblocked polydiorganosiloxane and a silazane which is the appropriate precursor for the silyl endgroup desired. The mixture of hydroxyl endblocked polydiorganosiloxane and silazane are reacted in a closed (sealed) mixer by heating until the reaction is complete and then removing the ammonia which is formed from the reaction. Also removed is by-produced siloxane dimers, and any unreacted silazane.

A mixture of polydiorganosiloxanes can be illustrated by a mixture of dimethylvinylsilyl endblocked polymethyl(3,3,3-trifluoropropyl)siloxane and hydroxyl endblocked polymethyl(3,3,3-trifluoropropyl)siloxane. In these polydiorganosiloxane mixtures, the maximum amount of methylvinylsiloxane units present is 2 mol percent, preferably less than one mol percent methylvinylsiloxane units are present.

The hydroxyl endblocked polydiorganosiloxane are known in the art as shown by Johannson, Hyde et al, McVannel, and Brown which are incorporated by reference to show these polymers and their preparation.

The reinforcing silica in the silanol-containing silicone elastomer bases used in the method of the present invention can have a surface area of at least 100 square meters per gram (m$^2$/g), preferably at least 200 m$^2$/g. The reinforcing silica is available commercially and can be a fumed silica or a precipitated silica. The surface of the silica can also be treated with an organosilazane to produce a hydrophobic silica. The groups on the surface which make the silica hydrophobic are siloxy units in which the organic groups are methyl, vinyl, and 3,3,3-trifluoropropyl or the siloxy unit can be of the formula

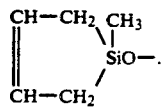

Treated reinforcing silica preferably has a composition such that the weight ratio is at least 2 parts by weight of silica per part by weight of triorganosiloxy unit. The amount of reinforcing silica can be from 5 to 100 parts by weight per 100 parts by weight of polydiorganosiloxane, preferably from 15 to 55 parts by weight silica per 100 parts by weight polydiorganosiloxane.

After the modified silicone elastomer base is prepared, an organic peroxide is added to provide a modified silicone elastomer base which will cure when heated. The most preferred silicone elastomer bases are those which contain alkenyl radicals bonded to the silicon atoms of the polydiorganosiloxane and these are preferably cured by using a vinyl specific organic peroxide in an amount sufficient to cure the modified silicone elastomer base to form a silicone elastomer or silicone rubber and in the case of the use of a fluorine containing polydiorganosiloxane, a fluorosilicone rubber is obtained. Vinyl specific peroxides include 2,5-dimethyl-2,5-di(tertiary butylperoxy)hexane and dicumyl peroxide. 2,5-dimethyl-2,5-di(tertiarybutylperoxy)-hexane is preferred as the organic peroxide. The amount of organic peroxide is usually from 0.1 to 2 parts by weight based on 100 parts by weight of the silicone elastomer base. Other organic peroxides include benzoyl peroxide, tertiary-butyl peroxy isopropyl carbonate, alpha, alpha-bis-tertiary peroxy diisopropyl benzene, tertiary-butyl perbenzoate, and 2,4-dichlorobenzoyl peroxide.

The fluorosilicone elastomer bases can also contain other vinyl-containing polydiorganosiloxane gums and fluids for the purpose of further increasing the durometer, tensile strength, and tear strength. Examples of these vinyl-containing polydiorganosiloxane fluids include a copolymer of dimethylsiloxane units and methylvinylsiloxane units which is endblocked with trimethylsiloxy units having a viscosity at 25° C. of from 1,000 to 50,000 centipoise and a dimethylvinylsiloxy endblocked poly-methyl(3,3,3-trifluoropropyl)siloxane fluid with from 10 to 100 units per molecule. The amounts of such fluids can be up to 25 parts by weight. Preferably, the vinyl-containing polydiorganosiloxane fluid is a copolymer of dimethylsiloxane units and methylvinylsiloxane units with methylvinylsiloxane units present in copolymer from 5 to 30 mol percent. The amounts of such copolymers are preferably present in the composition from 0.5 to 5 parts by weight per 100 parts by weight of the polydiorganosiloxane.

Other ingredients which might be used in formulating the silicone elastomer bases, including the fluorosilicone elastomer bases can be used. However, one should test the influence of each of the ingredients on the properties desired in any particular end use. Some ingredients may change the solvent and fuel resistance of the elastomer, and others may change the tensile properties. These other ingredients might include fillers other than reinforcing silica, such as titanium dioxide, zinc oxide, quartz, calcium carbonate, magnesium oxide, carbon black, graphite, glass fibers, glass microspheres, alumina, and the like. Pigments and other colorants may be used. Flame retardant additives such as platinum materials, plasticizers, and other compression set additives such as the rare earth oxides and octoates.

Silicone elastomer bases used in the method of the present invention which show significant reduction in compression set are those made from hydroxyl endblocked polydiorganosiloxane gum mixtures containing small amounts of pendant vinyl along the polysiloxane chain. The pendent vinyl is present as methylvinylsiloxane units in the gum. It was observed that curing gums with pendant vinyl and without reinforcing silica showed essentially no difference in properties between silanol endblocked gums and dimethylvinylsiloxy endblocked gums. Even when silica in the amounts of 30 parts by weight per 100 parts by weight of gum were used, the cured rubbers did not exhibit significant differences between those endblocked with silanol and those endblocked with dimethylvinylsiloxy units. Even treating the silica filler did not show any significance differences in the cured properties. Compositions made with gums which only had vinyl at the chain end, i.e. endblocked with dimethylvinylsiloxy units, show significant differences in the cured properties between silanol endblocked and the dimethylvinylsiloxy endblocked gums when treated reinforcing silica was present and a vinyl specific peroxide was used. In the silica filler compositions containing gum with alkenyl unsaturation at the chain terminals, differences were observed when different kinds of endblockers were used. Increasing the reinforcing silica filler content in the composition will also increase the durometer.

The silicone elastomers prepared by the method of this invention, especially the fluorosilicone rubber exhibit low compression set.

The following examples are for illustrative purposes only and should not be construed as limiting the invention which is properly delineated in the claims. In the examples, "parts" is parts by weight and the viscosities are at 25° C. unless otherwise stated.

EXAMPLE

Preparation of Silicone Elastomer Base A

The ingredients listed below were placed in a three-gallon dough type mixer equipped with heating means and means for drawing a vacuum. The mixer was closed (sealed) after the ingredients were added, then the contents were massed at a temperature of 110° C. to 120° C. for about one hour. After the contents were massed, it was cooled and Silicone Elastomer Base A was then removed from the mixer.

| Ingredients used to prepare Silicone Elastomer Base A | |
|---|---|
| PARTS | INGREDIENT |
| 67.0 | Gum A, a hydroxyl endblocked (HOSi) polymethyl-(3,3,3-trifluoropropyl)siloxane having a Williams plasticity in the range of 0.090 to 0.140 inch |
| 30.0 | Gum B, a hydroxyl endblocked poly-co{methyl-(3,3,3-trifluoropropyl)siloxane methylvinylsiloxane} having 99.4 mol percent methyl(3,3,3-trifluoropropyl)siloxane units and 0.6 mol percent methylvinylsiloxane units and a William plasticity in the range of 0.090 to 0.110 inch |
| 3.0 | Gum C, a hydroxyl endblocked poly-co{dimethylsiloxane-methylvinylsiloxane} having 96 mole percent dimethylsiloxane units and 4 mole percent methylvinylsiloxane units and a William plasticity in the range of 0.060 to 0.070 inch |
| 15.4 | Fluid A, a hydroxyl endblocked Poly(methyl-3,3,3-trifluoropropylsiloxane) having about 4 weight percent silicon-bonded hydroxyl |
| 0.54 | Fluid B, a hydroxyl endblocked poly(methylvinylsiloxane having about 4.5 weight percent silicon-bonded hydroxyl |
| 44 | Reinforcing silica filler having a surface area of about 400 m²/g |

Preparation of Silicone Elastomer Base B

The ingredients listed below were placed in a dough type mixer equipped with heating means and means for drawing a vacuum. The mixer was closed (sealed) after the ingredients were added, then the contents were massed at a temperature of 115° C. to 120° C. for about two hours. After the contents were massed, it was cooled and Silicone Elastomer Base B was then removed from the mixer.

| Ingredients used to prepare Silicone Elastomer Base B | |
|---|---|
| PARTS | INGREDIENT |
| 47.58 | Gum A, a hydroxyl enblocked (HOSi) polymethyl-(3,3,3-trifluoropropyl)siloxane having a Williams plasticity in the range of 0.090 to 0.140 inch |
| 21.3 | Gum B, a hydroxyl endblocked poly-co{methyl-3,3,3-trifluoropropyl siloxane-methylvinylsiloxane} having 99.4 mol percent methyl(3,3,3-trifluoropropyl)siloxane units and 0.6 mol percent methylvinylsiloxane units and a William plasticity in the range of 0.090 to 0.110 inch |
| 2.13 | Gum C, a hydroxyl endblocked poly-co{dimethylsiloxane-methylvinylsiloxane} having 96 mole percent dimethylsiloxane units and 4 mole percent methylvinylsiloxane units and a William plasticity in the range of 0.060 to 0.070 inch |

-continued

| Ingredients used to prepare Silicone Elastomer Base B | |
|---|---|
| PARTS | INGREDIENT |
| 7.46 | Fluid A, a hydroxyl endblocked poly(methyl-3,3,3-trifluoropropylsiloxane) having about 4 weight percent silicon-bonded hydroxyl |
| 0.23 | Fluid B, a hydroxyl endblocked poly(methylvinylsiloxane having about 4.5 weight percent silicon-bonded hydroxyl |
| 21.3 | Reinforcing silica filler having a surface area of about 400 m²/g |

Preparation of Silicone Elastomer Base C

Silicone Elastomer Base C was prepared as described for Silicone Elastomer Base A except that after the base was massed, a vacuum of 22 inches of mercury was drawn for 1.5 hours at about 120° C. The ingredients were otherwise as listed for Silicone Elastomer Base A.

Silicone Elastomer Base D

Silicone Elastomer Base D was prepared as described for Silicone Elastomer Base A but was a repeat.

Preparation of Silicone Elastomers

Silicone elastomers were prepared by mixing 100 parts of a silicone elastomer base with tetramethyldivinyldisilazane as shown in the Table. These ingredients were mixed in a dough type mixer equipped with a heating means using external steam and a means for drawing a vacuum. The mixer was closed and heated at full steam for one hour and then while the heating continued a vacuum of 19 inches of mercury was applied for 20 minutes. The resulting silicone elastomer composition was cooled and one part of 2,5-dimethyl-2,5-(tertiarybutylperoxy)-hexane was mixed in and test slabs were molded by heating for 10 minutes at 171° C. The test slabs were tested and the results obtained are identified as "Initial." Test slabs were also post cured at 200° C. for 4 hours and the results obtained are identified as "Post Cured."

The cured specimens (test slabs) were prepared in accordance with the specific test requirements for measuring a property. The test were:

Durometer, on the Shore A scale, was determined according to ASTM-D2240.

Tensile strength at break in pound per square inch (psi), elongation at break in percent, and modulus at 100% elongation in psi were measured according to ASTM-D412.

Tear strength, Die B, in pounds per inch (ppi) was measured according to ASTM-D624.

Compression set in percent was determined according to ASTM-D395 with the conditions being 22 hours at 177° C.

Bashore was determined according to ASTM-D2632.

TABLE

| SAMPLE | SILICONE ELASTOMER BASE | SILAZANE PARTS | DUROMETER | | TENSILE STRENGTH | | ELONGATION | |
|---|---|---|---|---|---|---|---|---|
| | | | INITIAL | POST CURED | INITIAL | POST CURED | INITIAL | POST CURED |
| 1* | B | 0 | 37 | 42 | 1306 | 1239 | 507 | 514 |
| 2 | B | 0.5 | 47 | 50 | 1288 | 1236 | 412 | 410 |
| 3* | A | 0 | 53 | 58 | 1491 | 1346 | 461 | 439 |
| 4 | A | 0.5 | 64 | 66 | 1394 | 1366 | 324 | 331 |
| 5** | A | 1.25 | 64 | 65 | 1460 | 1271 | 302 | 298 |
| 6(*)(**) | C | 0 | — | 56 | — | 1552 | — | 406 |
| 7**(1) | C | 0.5 | — | 66 | — | 1513 | — | 321 |
| 8**(2) | C | 1.0 | — | 69 | — | 1443 | — | 277 |
| 9(*)(**) | D | 0 | — | 58 | — | 1334 | — | 327 |
| 10** | D | 0.5 | — | 63 | — | 1313 | — | 301 |
| 11** | D | 1.0 | — | 66 | — | 1397 | — | 289 |
| 12**(3) | D | 0.5 | — | 68 | — | 1306 | — | 283 |
| 13**(4) | D | 1.0 | — | 65 | — | 1299 | — | 282 |
| 14**(5) | A | 0.25 | — | 63 | — | 1439 | — | 372 |
| 15**(6) | A | 0.25 | — | 65 | — | 1360 | — | 342 |
| 16**(7) | A | 0.25 | — | 68 | — | 1337 | — | 316 |

| SAMPLE | TEAR STRENGTH | | MODULUS (100%) | | COMPRESSION SET | BASHORE | |
|---|---|---|---|---|---|---|---|
| | INITIAL | POST CURED | INITIAL | POST CURED | POST CURED | INITIAL | POST CURED |
| 1* | 199 | 200 | 141 | 134 | 27.7 | 24 | 20 |
| 2 | 177 | 157 | 211 | 213 | 21.5 | 29 | 25 |
| 3* | 261 | 247 | 228 | 242 | 26.3 | 21 | 20 |
| 4 | 171 | 177 | 368 | 367 | 15.9 | 26 | 23 |
| 5** | 166 | 160 | 388 | 371 | 15.7 | 24 | 23 |
| 6(*)(**) | — | 223 | — | 282 | 15.8 | — | 21 |
| 7**(1) | — | 151 | — | 421 | 11.2 | — | 25 |
| 8**(2) | — | 128 | — | 505 | 10.0 | — | 27 |
| 9(*)(**) | — | 228 | — | 294 | 22 | — | 18 |
| 10** | — | 139 | — | 391 | 17.0 | — | 20 |
| 11** | — | 144 | — | 434 | 15.7 | — | 21 |
| 12**(3) | — | 132 | — | 426 | 19.8 | — | 21 |
| 13**(4) | — | 123 | — | 424 | 14.8 | — | 21 |
| 14**(5) | — | 186 | — | 349 | 23.7 | — | 20 |
| 15**(6) | — | 179 | — | 374 | 24.2 | — | 20 |

TABLE-continued

| 16**(7) | — | 170 | — | 436 | 24.6 | — | 21 |

*Control samples presented for comparative purposes.
**Also contains 1.0 part of a heat stability additive.
(1)A vacuum of 22 inches mercury was drawn for 30 minutes on the silicone elastomer composition after the heating step was completed prior to the addition of the heat stability additive and the peroxide.
(2)A Vacuum of 20 inches mercury was drawn for one hour on the silicone elastomer composition after the heating step was completed prior to the addition of the heat stability additive and the peroxide.
(3)This silicone elastomer composition had 2 parts of the reinforcing silica filler, 3 parts of a green pigment, and 0.5 part of carbon black added to it at the time the peroxide was added.
(4)This silicone elastomer composition had 3 parts of a green pigment and 0.5 part of carbon black added to it at the time the peroxide was added.
(5)After the silazane was added to the silicone elastomer composition was heated for one hour at 160° C. and the vacuum was drawn for one hour at 160° C.
(6)After the silazane was added the silicone elastomer composition was heated for one hour at 150° C. and the vacuum was drawn for one hour at 150° C.
(7)After the silazane was added the silicone elastomer composition was heated for one hour at 150° C. and the vacuum was drawn for one hour at 150° C. At the time the peroxide was added 2 parts of the reinforcing silica filler and 3.5 parts of a green pigment was mixed into the silicone elastomer composition.

The results of the Table show that the hardness (durometer) and modulus increased when the silazane was added and the tear strength and the compression set values decreased. Although it is not desirable for the tear strength to be at the lower values, the reduced compression set is the more important property in gasket and O-ring applications. It was also observed that the decrease in tear strength in some cases was not substantial and at the same time the compression set was reduced.

That which is claimed is:

1. A method to reduce compression set in silicone elastomer comprising
   adding a compression set reducing amount of an alkenyl silazane to a previously prepared, base heated, silanol-containing silicone elastomer base comprising a polydiorganosiloxane gum and a reinforcing silica filler, where the silazane has the formula $(X)_2NH$ in which X is a silyl selected from the group consisting of methylphenylvinylsilyl, $$\begin{array}{c} CH-CH_2 \\ \parallel \\ CH-CH_2 \end{array}\!\!\!\!\!\begin{array}{c} CH_3 \\ \diagdown\!\!\diagup \\ Si- \\ \diagup \end{array} \quad \text{and} \quad (CH_2\!=\!CH)(CH_2)_y Si(OSi)_x\!\!-\!\!\begin{array}{c} CH_3\,CH_3 \\ \mid\quad\mid \\ \mid\quad\mid \\ CH_3\,CH_3 \end{array}$$

in which x has a value of from 0 to 10 and y has a value of from 0 to 8,
   mixing the silazane and the silicone elastomer base in a closed mixer with heating means and means for drawing a vacuum,
   heating the mixer contents at a temperature and for a time sufficient to allow silazane to react with silanol groups in the silicone elastomer base,
   removing by-produced ammonia, by-produced siloxane dimer, and any unreacted alkenyl silazane from the mixer contents,
   obtaining a modified silicone elastomer base which cures to a silicone elastomer having a compression set lower than a silicone elastomer obtained by curing the silicone elastomer base which is unmodified with alkenyl silazane,
   adding an amount of an organic peroxide sufficient to cure the modified silicone elastomer base when heated.

2. The method in accordance with claim 1 in which the silicone elastomer base comprises a hydroxyl endblocked polydiorganosiloxane gum and a reinforcing silica filler which is hydrophobed by reaction with silazanes, hydroxyl containing polyorganosiloxanes, or alkoxypolyorganosiloxanes.

3. The method in accordance with claim 1 in which the polydiorganosiloxane gum of the silicone elastomer base is at least 90 weight percent of a polydiorganosiloxane of a general formula $$\begin{array}{c} CH_3 \quad\ R \\ \mid\qquad\mid \\ H-O-(SiO)_x-(SiO)_y-H \\ \mid\qquad\quad\mid \\ CF_3CH_2CH_2 \quad R' \end{array}$$

in which x has a value of at least 800, y has a value of from 0 to 20 percent of the sum of x plus y, the sum of x and y is at least 1000, each R is methyl or phenyl, each R' is vinyl or phenyl, where there is a maximum of 2 mol percent methylvinylsiloxane units in said polydiorganosiloxane, and up to 10 weight percent of polydiorganosiloxane in which the diorganosiloxane units are composed of 0.1 to 10 mole percent methylvinylsiloxane units and 90 to 99.9 mole percent dimethylsiloxane units.

4. The method in accordance with claim 2 in which the polydiorganosiloxane gum of the silicone elastomer base is at least 90 weight percent of a polydiorganosiloxane of a general formula $$\begin{array}{c} CH_3 \quad\ R \\ \mid\qquad\mid \\ H-O-(SiO)_x-(SiO)_y-H \\ \mid\qquad\quad\mid \\ CF_3CH_2CH_2 \quad R' \end{array}$$

in which x has a value of at least 800, y has a value of from 0 to 20 percent of the sum of x plus y, the sum of x and y is at least 1000, each R is methyl or phenyl, each R' is vinyl or phenyl, where there is a maximum of 2 mol percent methylvinylsiloxane units in said polydiorganosiloxane, and up to 10 weight percent of polydiorganosiloxane in which the diorganosiloxane units are composed of 0.1 to 10 mole percent methylvinylsiloxane units and 90 to 99.9 mole percent dimethylsiloxane units.

5. The method in accordance with claim 1 in which the silicone elastomer base is 100 parts by weight of the polydiorganosiloxane gum, 5 to 100 parts by weight of a reinforcing silica filler having a surface area of at least 100 m$^2$/g, and the organic peroxide is a vinyl specific organic peroxide.

6. The method in accordance with claim 2 in which the silicone elastomer base is 100 parts by weight of the polydiorganosiloxane, 5 to 100 parts by weight of a reinforcing silica filler having a surface area of at least 100 m$^2$/g, and the organic peroxide is a vinyl specific organic peroxide.

7. The method in accordance with claim 3 in which the silicone elastomer base is 100 parts by weight of the polydiorganosiloxane gum, 5 to 100 parts by weight of a reinforcing silica filler having a surface area of at least 100 m²/g, and the organic peroxide is a vinyl specific organic peroxide.

8. The method in accordance with claim 4 in which the silicone elastomer base is 100 parts by weight of the polydiorganosiloxane gum, 5 to 100 parts by weight of a reinforcing silica filler having a surface area of at least 100 m²/g, and the organic peroxide is a vinyl specific organic peroxide.

9. The method in accordance with claim 1 in which the alkenyl silazane is tetramethyldivinyldisilazane.

10. The method in accordance with claim 9 in which the amount of tetramethyldivinyldisilazane is from 0.1 to 2 weight percent based on the total weight of the silicone elastomer base.

11. The method in accordance with claim 5 in which the alkenyl silazane is tetramethyldivinyldisilazane.

12. The method in accordance with claim 11 in which the amount of tetramethyldivinyldisilazane is from 0.1 to 2 weight percent based on the total weight of the silicone elastomer base.

13. The method in accordance with claim 6 in which the alkenyl silazane is tetramethyldivinyldisilazane.

14. The method in accordance with claim 13 in which the amount of tetramethyldivinyldisilazane is from 0.1 to 2 weight percent based on the total weight of the silicone elastomer base.

15. The method in accordance with claim 7 in which the alkenyl silazane is tetramethyldivinyldisilazane.

16. The method in accordance with claim 15 in which the amount of tetramethyldivinyldisilazane is from 0.1 to 2 weight percent based on the total weight of the silicone elastomer base.

17. The method in accordance with claim 8 in which the alkenyl silazane is tetramethyldivinyldisilazane.

18. The method in accordance with claim 17 in which the amount of tetramethyldivinyldisilazane is from 0.1 to 2 weight percent based on the total weight of the silicone elastomer base.

19. The silicone elastomer composition prepared by the method of claim 1.

20. The silicone elastomer prepared by heating the silicone elastomer composition of claim 19 above the activation temperature of the organic peroxide.

21. The silicone elastomer composition prepared by the method of claim 2.

22. The silicone elastomer prepared by heating the silicone elastomer composition of claim 21 above the activation temperature of the organic peroxide.

23. The silicone elastomer composition prepared by the method of claim 3.

24. The silicone elastomer prepared by heating the silicone elastomer composition of claim 23 above the activation temperature of the organic peroxide.

25. The silicone elastomer composition prepared by the method of claim 5.

26. The silicone elastomer prepared by heating the silicone elastomer composition of claim 25 above the activation temperature of the organic peroxide.

27. The silicone elastomer composition prepared by the method of claim 9.

28. The silicone elastomer prepared by heating the silicone elastomer composition of claim 27 above the activation temperature of the organic peroxide.

29. The silicone elastomer composition prepared by the method of claim 18.

30. The silicone elastomer prepared by heating the silicone elastomer composition of claim 29 above the activation temperature of the organic peroxide.

* * * * *